US012809757B2

(12) United States Patent
Xiao et al.

(10) Patent No.: US 12,809,757 B2
(45) Date of Patent: Nov. 24, 2026

(54) POD-BASED CONTROL OF SYSTEM TESTING LOAD

(71) Applicant: Dell Products L.P., Round Rock, TX (US)

(72) Inventors: Pan Xiao, Chengdu (CN); Shuangshuang Liang, Guizhou Province (CN); Si Zhang, Chengdu (CN); Yang Zhang, Chengdu (CN)

(73) Assignee: Dell Products L.P., Round Rock, TX (US)

( * ) Notice: Subject to any disclaimer, the term of this patent is extended or adjusted under 35 U.S.C. 154(b) by 241 days.

(21) Appl. No.: 18/587,036

(22) Filed: Feb. 26, 2024

(65) Prior Publication Data

US 2025/0265177 A1 Aug. 21, 2025

(30) Foreign Application Priority Data

Feb. 21, 2024 (CN) ......................... 202410191786.3

(51) Int. Cl.
*G06F 9/44* (2018.01)
*G06F 9/445* (2018.01)
(Continued)

(52) U.S. Cl.
CPC .......... *G06F 11/3688* (2013.01); *G06F 9/505* (2013.01)

(58) Field of Classification Search
CPC ............. G06F 11/3688; G06F 11/3684; G06F 11/2273; G06F 9/505; G06F 9/5083
See application file for complete search history.

(56) References Cited

U.S. PATENT DOCUMENTS 11,768,760 B2 * 9/2023 Moeller .............. G06F 11/3698 714/38.1
11,775,352 B1 * 10/2023 Krishnegowda ...... G06F 9/5061 718/104

(Continued)

FOREIGN PATENT DOCUMENTS

CN 115048313 A * 9/2022 .......... G06F 11/3684

OTHER PUBLICATIONS

Zhiwei Zhang, A Node Agent for Fast and Safe Execution of ComputingTasks under Kubernetes, 2023, pp. 1-9. https://ieeexplore.ieee.org/stamp/stamp.jsp?tp=&arnumber=10242630 (Year: 2023).*

(Continued)

*Primary Examiner* — Mongbao Nguyen
(74) *Attorney, Agent, or Firm* — Ryan, Mason & Lewis, LLP

(57) ABSTRACT

Methods, apparatus and non-transitory processor-readable storage mediums are provided for pod-based control of system testing load. One method comprises obtaining a test script that tests a system; executing the test script on at least one pod of a containerized environment, wherein the execution of the test script on the at least one pod generates a load on the system; and automatically controlling an amount of the load generated by the test script on the system at a given time by adjusting a number of the pods of the containerized environment executing the test script. A number of pods executing a given containerized test script may be adjusted to provide a corresponding adjustment to the applied load. A given node cluster of multiple node clusters may be selected to execute the test script based on a resource availability of the node clusters.

20 Claims, 10 Drawing Sheets

(51) Int. Cl.

| | |
|---|---|
| ***G06F 9/45*** | (2006.01) |
| ***G06F 9/455*** | (2018.01) |
| ***G06F 9/50*** | (2006.01) |
| ***G06F 11/3668*** | (2025.01) |

(56) References Cited

U.S. PATENT DOCUMENTS

| | | | | |
|---|---|---|---|---|
| 11,843,548 | B1 * | 12/2023 | Devendranath | H04L 47/822 |
| 2020/0036621 | A1 * | 1/2020 | Veeraraghavan | G06F 11/3698 |
| 2021/0406159 | A1 * | 12/2021 | Moeller | G06F 11/3414 |
| 2022/0276953 | A1 * | 9/2022 | Padala | G06F 11/3433 |
| 2022/0318060 | A1 * | 10/2022 | Choochotkaew | G06F 9/5005 |
| 2022/0365870 | A1 * | 11/2022 | Neumann | G06F 11/3684 |
| 2023/0123350 | A1 * | 4/2023 | Panikkar | G06F 9/505 718/105 |
| 2023/0195596 | A1 * | 6/2023 | Mazumdar | G06F 11/3419 717/131 |
| 2023/0236897 | A1 * | 7/2023 | Kumar | G06F 9/505 718/104 |
| 2023/0259446 | A1 * | 8/2023 | Sharma | G06F 11/3414 702/182 |
| 2024/0095158 | A1 * | 3/2024 | Miriyala | G06F 11/3696 |
| 2024/0103896 | A1 * | 3/2024 | Jiang | G06F 16/21 |
| 2024/0289251 | A1 * | 8/2024 | Stipanovich | G06F 11/3616 |
| 2025/0199844 | A1 * | 6/2025 | Dubey | G06F 11/3414 |

OTHER PUBLICATIONS

Qing Lei, Performance and Scalability Testing Strategy Based on Kubemark, 2019, pp. 1-6. https://ieeexplore.ieee.org/stamp/stamp.jsp?tp=&arnumber=8725658 (Year: 2019).*

Ruiqi Zeng, A Novel Construction Technology of Microservice Multi-instance System Automatic Deployment and Upgrade, 2023, pp. 1-6. https://ieeexplore.ieee.org/stamp/stamp.jsp?tp=&arnumber=10284899 (Year: 2023).*

Fotis Nikolaidis, Frisbee: automated testing of Cloud-native applications in Kubernetes, 2021, pp. 1-14. https://arxiv.org/pdf/2109.10727 (Year: 2021).*

English translation, Qu et al. (CN 115048313 A), 2022, pp. 1-22. (Year: 2022).*

"Iometer User's Guide"; downloaded on Jan. 10, 2024.

Python_kubernetes_README.md at master • kubernetes-client_python • GitHub; downloaded on Jan. 10, 2024.

WorkloadWisdom_User_Guide_6_8_4_Jan. 10, 2021; Jan. 10, 2021.

ZooKeeper_ Because Coordinating Distributed Systems is a Zoo; Oct. 9, 2023.

* cited by examiner

600

TEST INSTANCE INITIATION PROCESS

OBTAIN USER PARAMETERS ENTERED INTO API 500;

STORE SPECIFIED USER PARAMETERS IN PERSISTENT STORAGE;

POD-BASED SYSTEM TEST LOAD CONTROLLER 400 SELECTS AN AVAILABLE CLUSTER;

LAUNCH TEST INSTANCE USING SPECIFIED USER PARAMETERS AND SELECTED CLUSTER;

IF USER SELECTED A STEADY PLAY MODE, RETURN SINCE NO MORE TEST UPDATES;

SET TEST PLAY INTERVAL TO INTERVAL SPECIFIED IN USER PARAMETERS;

SET TEST PLAY GRADIENT TO GRADIENT SPECIFIED IN USER PARAMETERS;

SET TEST PLAYBACK MODE TO PLAYBACK MODE SPECIFIED IN USER PARAMETERS;

SET TEST MAXIMUM NUMBER OF PODS TO MAXIMUM POD NUMBER SPECIFIED IN USER PARAMETERS;

SET TEST MINIMUM NUMBER OF PODS TO MINIMUM POD NUMBER SPECIFIED IN USER PARAMETERS; AND

INITIATE TEST LOAD ADJUSTMENT PROCESS OF FIG. 6B.

FIG. 6A

650

TEST LOAD ADJUSTMENT PROCESS

OBTAIN THE CURRENT POD NUMBER OF THE LAUNCHED TEST INSTANCE;

WHILE THE TEST INSTANCE IS RUNNING:

IF USER-SPECIFIED TIME INTERVAL HAS EXPIRED:

(A) PERFORM SCALE UP, SCALE DOWN OR RANDOM LOAD CHANGE; AND (B) UPDATE THE NUMBER OF PODS EXECUTING THE TEST INSTANCE USING THE USER-SPECIFIED GRADIENT AND THE CURRENT POD NUMBER;

IF THE CURRENT POD NUMBER HAS REACHED THE USER-SPECIFIED MAXIMUM OR MINIMUM NUMBER OF PODS, CHECK THE PLAYBACK SETTINGS:

(A) FOR A KEEP PLAYBACK MODE, TEST INSTANCE CONTINUES TO EXECUTE WITHOUT POD NUMBER CHANGE;

(B) FOR A REPEAT PLAYBACK MODE, TEST INSTANCE RESETS TO ORIGINAL POD NUMBER; AND (C) FOR A REVERSE PLAYBACK MODE, SCALE-DOWN MODE WILL CHANGE TO SCALE-UP MODE, OR VICE VERSA;

END WHILE LOOP.

FIG. 6B

POD-BASED CONTROL OF SYSTEM TESTING LOAD

BACKGROUND

Information processing systems increasingly utilize reconfigurable virtual resources to meet changing user needs in an efficient, flexible, and cost-effective manner. It is often necessary to execute one or more test scripts to evaluate a given system, such as a server system, a storage system and/or a database system. Conventional approaches for managing the system load applied by the execution of such test scripts, however, have a number of limitations which, if overcome, could further improve the flexibility and/or scope of such testing.

SUMMARY

Illustrative embodiments of the disclosure provide techniques for pod-based control of a system testing load. An exemplary method comprises obtaining a test script that tests at least a portion of a system; initiating an execution of the test script on one or more pods of a containerized environment, wherein the execution of the test script on the one or more pods of the containerized environment generates a load on the system; and automatically controlling an amount of the load generated by the test script on the system at a given time by adjusting a number of the pods of the containerized environment executing the test script.

Illustrative embodiments can provide significant advantages relative to conventional techniques for controlling a system testing load. For example, problems associated with existing load testing tools are overcome in one or more embodiments by automatically controlling a load provided by a test script on a system by adjusting a number of the pods of a containerized environment executing the test script.

These and other illustrative embodiments include, without limitation, methods, apparatus, networks, systems and processor-readable storage media.

BRIEF DESCRIPTION OF THE DRAWINGS

FIG. 6A is a process diagram illustrating an exemplary implementation of a test instance initiation process in an illustrative embodiment;

FIG. 6B is a process diagram illustrating an exemplary implementation of a test load adjustment process in an illustrative embodiment;

DETAILED DESCRIPTION

Figure 1:
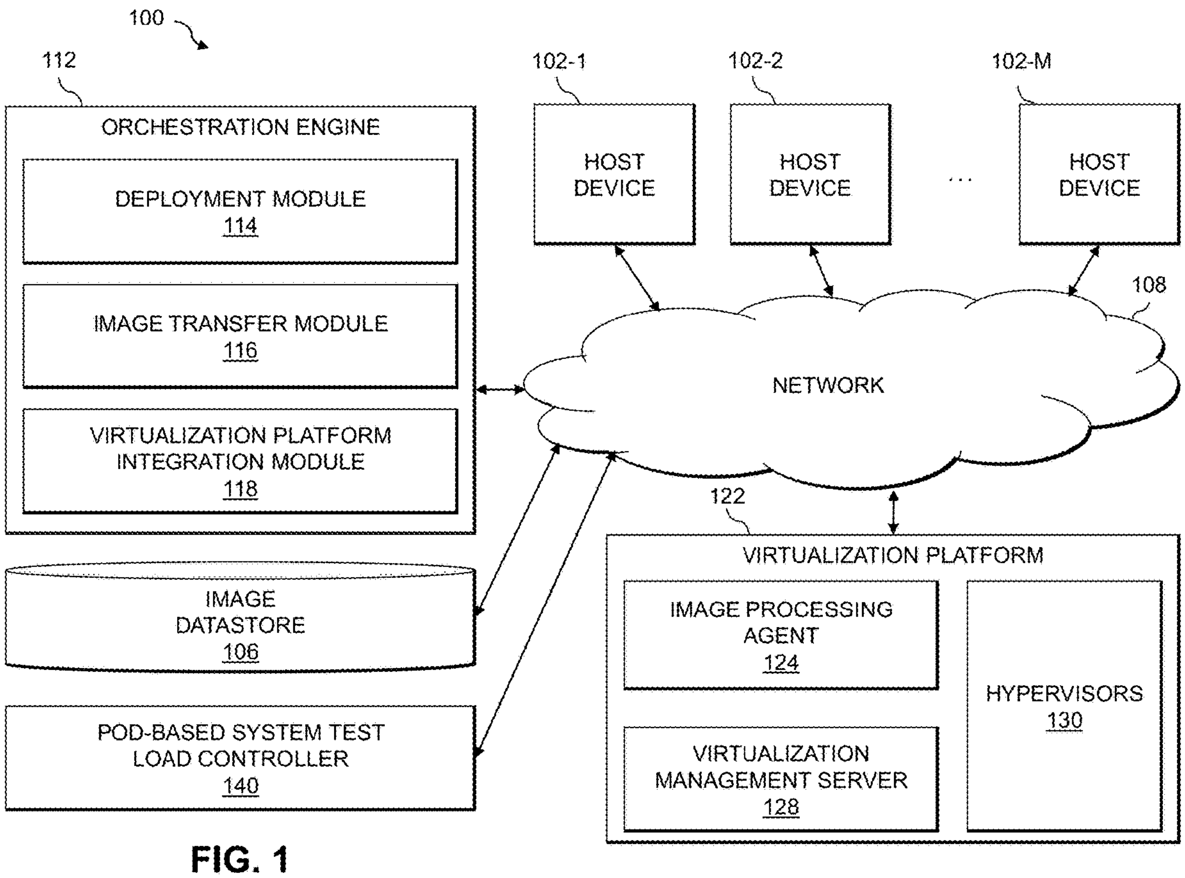
FIG. 1 is a block diagram of an information processing system that provides pod-based control of the system testing load in an illustrative embodiment.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

As the term is illustratively used herein, a container may be considered lightweight, stand-alone, executable software code that includes elements needed to run the software code. A container-based structure has many advantages including, but not limited to, isolating the software code from its surroundings, and helping reduce conflicts between different tenants or users running different software code on the same underlying infrastructure.

In one or more illustrative embodiments, containers may be implemented using a container-based orchestration system, such as a Kubernetes container orchestration system. Kubernetes is an open-source system for automating application deployment, scaling, and management within a container-based information processing system comprised of components referred to as pods, nodes, and clusters.

As noted above, existing testing tools for testing various systems have a number of limitations with respect to the amount of load that the system testing tools can apply to a system being tested. For example, once a test script is initiated, the applied load is typically maintained at the same level and cannot be varied during the test. The applied load may comprise, for example, a number of HTTP (Hypertext Transfer Protocol) requests in a given time interval (e.g., per second) sent to an HTTP server; a number of input/output operations sent to a storage system or a number of transactions generated for a database system. A given load test may involve a heavy load testing scenario (e.g., to verify whether the components of the system can function as expected when the resources of the system approach a limit) or a fluctuating load testing scenario (e.g., to simulate real world scenarios where the load of a system changes, for example, during peak and idle hours, or in other cases where the load may change). Generally, these tests require that the employed testing tools have the ability to customize an applied load to implement the desired testing scenario.

In one or more embodiments, containerized test scripts are employed to test a given system and a given pod executes one containerized application. In at least some embodiments, horizontal scaling techniques are employed to adjust a number of pods executing a given containerized test script to provide a corresponding adjustment to the applied load (e.g., a number of requests).

FIG. 1 shows an information processing system 100 configured in accordance with an illustrative embodiment to provide pod-based control of a system testing load. The information processing system 100 comprises one or more host devices 102-1, 102-2, . . . 102-M (collectively, host devices 102), an orchestration engine 112 that communicates over a network 108 with one or more virtualization platforms 122 and a pod-based system test load controller 140, as discussed further below in conjunction with FIG. 4. The orchestration engine 112 may deploy one or more containerized applications to one or more of the host devices 102 and/or the virtualization platform 122.

The host devices 102, orchestration engine 112 and/or virtualization platform 122 illustratively comprise respective computers, servers or other types of processing devices capable of communicating with one another via the network 108. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, a Storage-as-a-Service (STaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be at least partially implemented outside of the cloud infrastructure context, as in the case of a stand-alone computing and storage system implemented within a given enterprise.

In the FIG. 1 embodiment, the orchestration engine 112 includes a deployment module 114, an image transfer module 116 and a virtualization platform integration module 118. The deployment module 114 is configured in some embodiments to deploy one or more virtual resources (not shown in FIG. 1). The image transfer module 116 may be configured to transfer templates of such virtual resources (e.g., virtual machines and/or containers) to and/or from the host devices 102, virtualization platform 122 and/or an image datastore 106, discussed below. The virtualization platform integration module 118 integrates the orchestration engine 112 with the virtualization platform 122. The orchestration engine 112 may be implemented, for example, at least in part, using the Kubernetes open-source container orchestration system for automating deployment, scaling, and management of containers in one or more clusters. The orchestration engine 112 may provide a centralized management interface for monitoring and controlling the containers in a given cluster.

Images and other templates provide building blocks for container-based orchestration. Images and other templates comprise snapshots of a file system of a container that include the dependencies and configuration information needed to run a specific application or service. When a container is created from an image, for example, the container starts with the same file system as the image, allowing for consistency and predictability in the behavior of the container. Such images can be stored in a registry, such as image datastore 106, and can be pulled and run on any machine that has a container runtime.

At least portions of the functionality of the deployment module 114, the image transfer module 116 and/or the virtualization platform integration module 118 may be implemented at least in part in the form of software that is stored in memory and executed by a processor.

The virtualization platform 122, as shown in FIG. 1, comprises an image processing agent 124, a virtualization management server 128 and one or more hypervisors 130. The exemplary image processing agent 124 processes templates, such as obtaining one or more needed container images that are not available to the virtualization platform 122 at the time of a virtual resource deployment, and processing the obtained virtual resource templates to replicate (e.g., clone) a needed virtual resource using the template and associated deployment information. In some embodiments, the exemplary image processing agent 124 may be an agent of the orchestration engine 112. The virtualization management server 128 provides one or more functions for managing at least portions of the virtualization platform 122. In addition, the exemplary virtualization platform 122 further comprises one or more hypervisors 130 to execute one or more deployed virtual resources.

Additionally, the host devices 102, the orchestration engine 112 and/or the virtualization platform 122 can have an associated image datastore 106 configured to store container images or other virtual resource templates. The image datastore 106 in the present embodiment can be implemented using storage provided by one or more of the host devices 102 and/or a storage system (not shown in FIG. 1), or the image datastore 106 can be accessed over the network 108. Such storage systems can comprise any of a variety of different types of storage including network-attached storage (NAS), storage area networks (SANs), direct-attached storage (DAS) and distributed DAS, as well as combinations of these and other storage types, including software-defined storage. While the image datastore 106 is shown in FIG. 1 as a single datastore, the image datastore 106 may be implemented using multiple datastores, as would be apparent to a person of ordinary skill in the art.

The host devices 102, the orchestration engine 112 and/or the virtualization platform 122 in the FIG. 1 embodiment are assumed to be implemented using at least one processing platform, with each processing platform comprising one or more processing devices each having a processor coupled to a memory. Such processing devices can illustratively include particular arrangements of compute, storage and network resources. For example, processing devices in some embodiments are implemented at least in part utilizing virtual resources such as virtual machines or containers, or combinations of both as in an arrangement in which containers are configured to run on virtual machines.

The host devices 102, the orchestration engine 112 (or one or more components thereof such as the deployment module 114, image transfer module 116 and/or virtualization platform integration module 118) and the virtualization platform 122 may be implemented on respective distinct processing platforms, although numerous other arrangements are possible. For example, in some embodiments at least portions of one or more of the host devices 102, the orchestration engine 112 and the virtualization platform 122 are implemented on the same processing platform. The orchestration engine 112 and/or the virtualization platform 122 can therefore be implemented at least in part within at least one processing platform that implements at least a subset of the host devices 102.

The network 108 may be implemented using multiple networks of different types to interconnect storage system components. For example, the network 108 may comprise a portion of a global computer network such as the Internet, although other types of networks can be employed, including a wide area network (WAN), a local area network (LAN), a satellite network, a telephone or cable network, a cellular network, a wireless network such as a WiFi or WiMAX network, or various portions or combinations of these and other types of networks. The network 108 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The virtualization platform 122 in some embodiments may be implemented as part of a cloud-based system.

The host devices 102, the orchestration engine 112 and/or the virtualization platform 122 can be part of what is more generally referred to herein as a processing platform comprising one or more processing devices each comprising a processor coupled to a memory. A given such processing device may correspond to one or more containers or other types of virtualization infrastructure such as virtual machines. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. The virtualization platform 122 and the orchestration engine 112 may be implemented at least in part in the first geographic location, the second geographic location, and one or more other geographic locations. Thus, it is possible in some implementations of the system 100 for different ones of the host devices 102, the orchestration engine 112, and the virtualization platform 122 to reside in different data centers.

Numerous other distributed implementations of the host devices 102, the orchestration engine 112, and/or the virtualization platform 122 are possible. Accordingly, the host devices 102, the orchestration engine 112, and/or the virtualization platform 122 can also be implemented in a distributed manner across multiple data centers.

Additional examples of processing platforms utilized to implement portions of the system 100 in illustrative embodiments will be described in more detail below in conjunction with FIGS. 8 and 9.

It is to be understood that the particular set of elements shown in FIG. 1 for pod-based control of a system testing load is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

For example, the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

Figure 2:
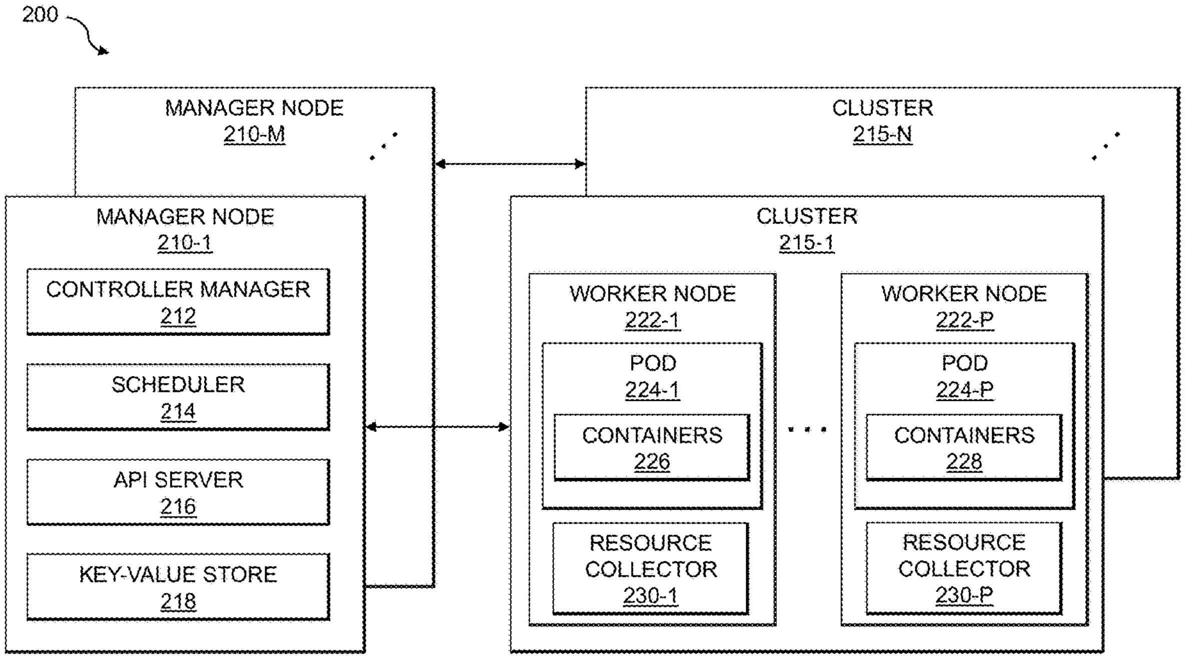
FIG. 2 illustrates a pod-based container environment within which one or more illustrative embodiments can be implemented.

FIG. 2 depicts an example of a pod-based container orchestration environment 200 in an illustrative embodiment. In the example shown in FIG. 2, a plurality of manager nodes 210-1, . . . 210-M (herein each individually referred to as a manager node 210 or collectively as manager nodes 210) are operatively coupled to a plurality of clusters 215-1, . . . 215-N (herein each individually referred to as a cluster 215 or collectively as clusters 215). Each cluster 215 may be managed by at least one manager node 210.

As shown in FIG. 2, each manager node 210 comprises a controller manager 212, a scheduler 214, an application programming interface (API) server 216, and a key-value store 218. It is to be appreciated that in some embodiments, multiple manager nodes 210 may share one or more of the same controller manager 212, scheduler 214, API server 216, and a key-value store 218.

Each cluster 215 comprises a plurality of worker nodes 222-1, . . . 222-P (herein each individually referred to as a worker node 222 or collectively as worker nodes 222). Each worker node 222 comprises a respective pod, i.e., one of a plurality of pods 224-1, . . . 224-P (herein each individually referred to as a pod 224 or collectively as pods 224), and a respective resource collector, i.e., one of a plurality of resource collectors 230-1, . . . 230-P (herein each individually referred to as a resource collector 230 or collectively as resource collectors 230). However, it is to be understood that one or more worker nodes 222 can run multiple pods 224 at a time. Each pod 224 comprises a set of one or more containers (e.g., containers 226 and 228). It is noted that each pod 224 may also have a different number of containers. As used herein, a pod may be referred to more generally as a containerized workload. Each resource collector 230 is configured to collect information (e.g., pertaining to resource utilization) related to its corresponding worker node 222, as explained in more detail elsewhere herein.

Worker nodes 222 of each cluster 215 execute one or more applications associated with pods 224 (e.g., containerized workloads executing test scripts). In at least some embodiments, each test script is containerized and a given pod 224 executes one containerized application. Each manager node 210 manages the worker nodes 222, and therefore pods 224 and containers, in its corresponding cluster 215 based at least in part on the information collected by its resource collectors 230. More particularly, each manager node 210 controls operations in its corresponding cluster 215 utilizing the above-mentioned components, e.g., controller manager 212, scheduler 214, API server 216, and key-value store 218, based at least in part on the information collected by the resource collectors 230. In general, controller manager 212 executes control processes (e.g., controllers) that are used to manage operations, for example, in the worker nodes 222. Scheduler 214 typically schedules pods to run on particular worker nodes 222 taking into account node resources and application execution requirements such as, but not limited to, deadlines. In general, in a Kubernetes implementation, API server 216 exposes the Kubernetes API, which is the front end of the Kubernetes container orchestration system. Key-value store 218 typically provides key-value storage for all cluster data including, but not limited to, configuration data objects generated, modified, deleted, and otherwise managed, during the course of system operations.

The functionality associated with the elements 212, 214, 216, and/or 218 in other embodiments can also be combined into a single module, or separated across a larger number of modules. As another example, multiple distinct processors can be used to implement different ones of the elements 212, 214, 216, and/or 218 or portions thereof.

At least portions of elements 212, 214, 216, and/or 218 may be implemented at least in part in the form of software that is stored in memory and executed by a processor.

Figure 3:
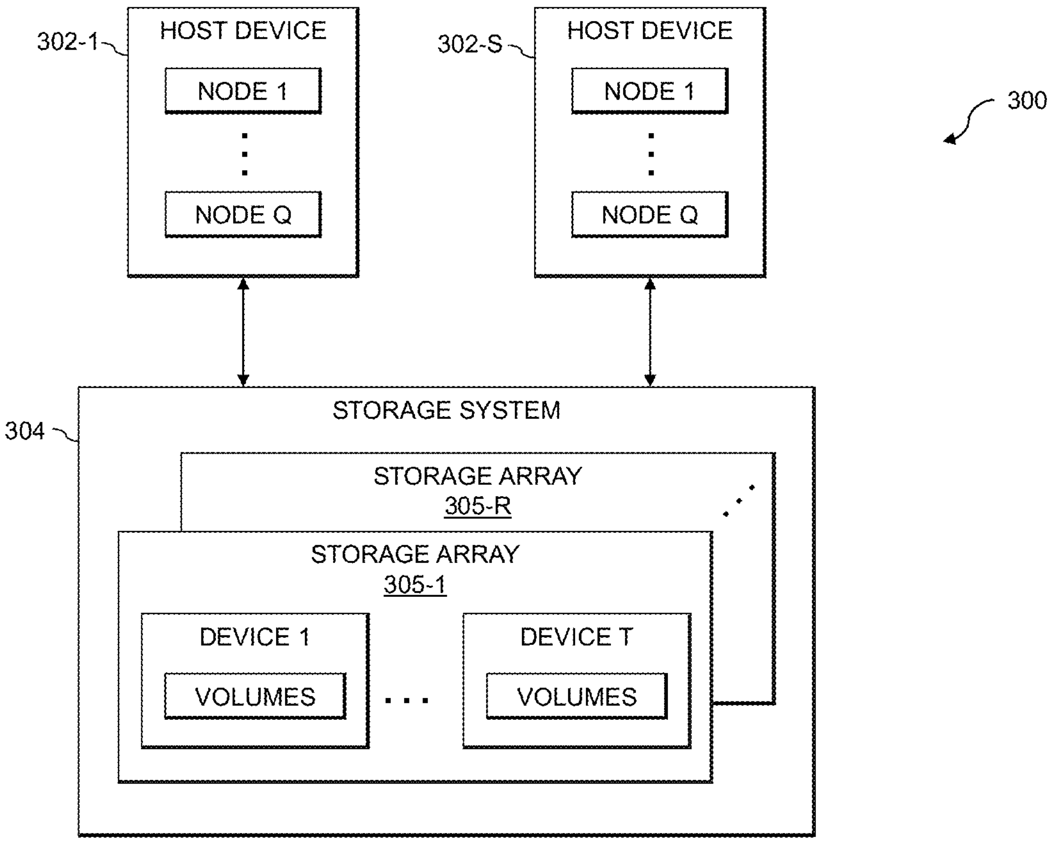
FIG. 3 illustrates host devices and a storage system within which one or more illustrative embodiments can be implemented.

Turning now to FIG. 3, an information processing system 300 is depicted within which the pod-based container orchestration environment 200 of FIG. 2 can be implemented. More particularly, as shown in FIG. 3, a plurality of host devices 302-1, . . . 302-S (herein each individually referred to as a host device 302 or collectively as host devices 302) are operatively coupled to a storage system 304. Each host device 302 hosts a set of nodes 1, . . . Q. Note that while multiple nodes are illustrated on each host device 302, a host device 302 can host a single node, and one or more host devices 302 can host a different number of nodes as compared with one or more other host devices 302.

As further shown in FIG. 3, storage system 304 comprises a plurality of storage arrays 305-1, . . . 305-R (herein each individually referred to as a storage array 305 or collectively as storage arrays 305), each of which is comprised of a set of storage devices 1, . . . T upon which one or more storage volumes are persisted. The storage volumes depicted in the storage devices of each storage array 305 can include any data generated in the information processing system 300 but, more typically, include data generated, manipulated, or otherwise accessed, during the execution of one or more applications in the nodes of host devices 302. One or more storage arrays 305 may comprise a different number of storage devices as compared with one or more other storage arrays 305.

Furthermore, any one of nodes 1, . . . Q on a given host device 302 can be a manager node 210 or a worker node 222 (FIG. 2). In some embodiments, a node can be configured as a manager node for one execution environment and as a worker node for another execution environment. Thus, the components of pod-based container orchestration environment 200 in FIG. 2 can be implemented on one or more of host devices 302, such that data associated with pods 224 (FIG. 2) running on the nodes 1, . . . Q is stored as persistent storage volumes in one or more of the storage devices 1, . . . T of one or more of storage arrays 305.

The storage system 304 of FIG. 3 is an example of a system that may be tested using the pod-based container environment of FIG. 2 to control a system testing load. Host devices 302, storage system 304 and the pod-based container environment are assumed to be implemented using at least one processing platform comprising one or more processing devices each having a processor coupled to a memory. Such processing devices can illustratively include particular arrangements of compute, storage, and network resources. In some alternative embodiments, one or more host devices 302, storage system 304 and/or the pod-based container environment can be implemented on respective distinct processing platforms and/or on the same processing platform.

In at least some embodiments, distributed implementations of information processing system 300 are possible, in which certain components of the system reside in one data center in a first geographic location while other components of the system reside in one or more other data centers in one or more other geographic locations that are potentially remote from the first geographic location. Thus, it is possible in some implementations of information processing system 300 for portions or components thereof to reside in different data centers. Numerous other distributed implementations of information processing system 300 are possible. Accordingly, the constituent parts of information processing system 300 can also be implemented in a distributed manner across multiple computing platforms.

Additional examples of processing platforms utilized to implement containers, container environments, and container management systems in illustrative embodiments, such as those depicted in FIGS. 2 and 3, will be described in more detail below in conjunction with additional figures.

It is to be appreciated that these and other features of illustrative embodiments are presented by way of example only, and should not be construed as limiting in any way.

Accordingly, different numbers, types and arrangements of system components can be used in other embodiments. Although FIG. 3 shows an arrangement wherein host devices 302 are coupled to just one plurality of storage arrays 305, in other embodiments, host devices 302 may be coupled to and configured for operation with storage arrays across multiple storage systems similar to storage system 304.

It should be understood that the particular sets of components implemented in information processing system 300 as illustrated in FIG. 3 are presented by way of example only. In other embodiments, only subsets of these components, or additional or alternative sets of components, may be used, and such components may exhibit alternative functionality and configurations. Additional examples of systems implementing pod-based container management functionality will be described below.

Still further, information processing system 300 may be part of a public cloud infrastructure. The cloud infrastructure may also include one or more private clouds and/or one or more hybrid clouds (e.g., a hybrid cloud is a combination of one or more private clouds and one or more public clouds).

A Kubernetes pod may be referred to more generally herein as a containerized workload. One example of a containerized workload is an application program configured to execute a test script.

Container-based microservice architectures have changed the way development and operations teams test and deploy modern software. Containers help companies modernize by making it easier to scale and deploy applications. The pod brings the containers together and makes it easier to scale and deploy applications. Kubernetes clusters allow containers to run across multiple machines and environments: such as virtual, physical, cloud-based, and on-premises environments. As shown and described above in the context of FIG. 2, Kubernetes clusters are generally comprised of one manager (master) node and one or more worker nodes. These nodes can be physical computers and/or virtual machines (VMs), depending on the cluster. Typically, a given cluster is allocated a fixed number of resources (e.g., CPU (central processing unit), memory, and/or other computer resources), and when a container is defined the number of resources from among the resources allocated to the cluster is specified. When the container starts executing, one or more pods are created on the deployed container that will serve the incoming requests.

Figure 4:
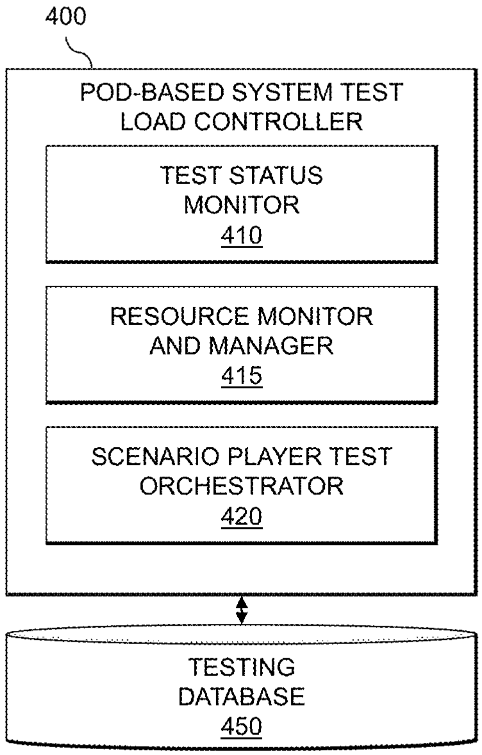
FIG. 4 illustrates an example of the pod-based system test load controller of FIG. 1 in an illustrative embodiment.

FIG. 4 illustrates an example of the pod-based system test load controller of FIG. 1 in an illustrative embodiment. In the example of FIG. 4, the pod-based system test load controller 400 comprises a test status monitor 410, a resource monitor and manager 415 and a scenario player test orchestrator 420. The pod-based system test load controller 400 communicates (e.g., over a network not shown in FIG. 4) with a testing database 450.

In some embodiments, the test status monitor 410 monitors the status of executing instances of test scripts. For example, the test status monitor 410 may evaluate whether the actual executing scale (or load) is as expected according to the scaling scenario specified by a user (e.g., by comparing each test instance of a test script to what a given user specified using the API 500 of FIG. 5, as discussed below.

The resource monitor and manager 415 monitors a set of designated metrics for each cluster 215. For example, the designated metrics may comprise one or more of a CPU utilization, a memory consumption, and a number of pods created. The availability of each cluster 215 may be evaluated using the designated metrics to perform a resource-based cluster selection for the execution of a given test script (e.g., by choosing a cluster 215 having the most idle resources or a cluster 215 having the lowest resource utilization).

In one or more embodiments, the scenario player test orchestrator 420 launches a given test script on the cluster 215 selected by the resource monitor and manager 415 and orchestrates the scaling steps to adjust the load provided by the given test script by changing the number of pods executing the test script, while also implementing other user-specified parameters, such as those discussed further below in conjunction with FIG. 5.

The functionality associated with the elements 410, 415 and/or 420 in other embodiments can also be combined into a single module, or separated across a larger number of modules. As another example, multiple distinct processors can be used to implement different ones of the elements 410, 415 and/or 420 or portions thereof.

At least portions of elements 410, 415 and/or 420 may be implemented at least in part in the form of software that is stored in memory and executed by a processor.

The pod-based system test load controller 400 utilizes various information stored in the testing database 450, such as execution logs providing information obtained from executions of one or more test scripts on various clusters 215, as well as the user-specified parameters for such test script executions. The testing database 450 in some embodiments is implemented using one or more storage systems or devices associated with the pod-based system test load controller 400. In some embodiments, one or more of the storage systems utilized to implement the testing database 450 comprise a scale-out all-flash content addressable storage array or other type of storage array.

In some embodiments, the test scripts being coordinated by the pod-based system test load controller 400 may be stored as images using a repository manager, such as the image datastore 106 (which may be implemented, for example, as an Artifactory repository manager). The testing database 450, or portions thereof, may be implemented, for example, using a Zookeeper backend storage system. In this manner, in the event of an application crash or a hardware crash, the pod-based system test load controller 400 can be restarted, resuming all test scripts with their respective user-specified scaling scenarios.

In some embodiments, the pod-based system test load controller 400 is used for an enterprise system. For example, an enterprise may subscribe to or otherwise utilize the pod-based control of system testing load provided by the pod-based system test load controller 400 to automatically control the load applied by test scripts. As used herein, the term "enterprise system" is intended to be construed broadly to encompass any group of systems or other computing devices. For example, the various clusters 215 of the pod-based container orchestration environment 200 may provide a portion of one or more enterprise systems. A given enterprise system may also or alternatively include one or more of the host devices 102. In some embodiments, an enterprise system includes one or more data centers, cloud infrastructure comprising one or more clouds, etc. A given enterprise system, such as cloud infrastructure, may host assets that are associated with multiple enterprises (e.g., two or more different businesses, organizations or other entities).

In one or more embodiments, a single pod executing a containerized test script is defined as the smallest test load granularity. In this manner, in a testing scenario, the load of a test can be measured based on the number of pods executing the respective containerized test script. One or more aspects of the disclosure recognize that an application can be launched (e.g., by Kubernetes) by setting the number of pods for the application. Each pod has a containerized environment that has the resources to execute the exact same application. For example, a test script may create 100 HTTP client connections to a server. By executing the test script in a pod, and setting the number of pods to two pods, in accordance with the disclosed techniques, results in 200 HTTP client connections to the server. In addition, load balancing techniques may be employed whereby the pods can be deployed to different worker nodes 222, to let the worker nodes 222 share the load from the running applications. By defining the test load in terms of the number of pods executing the test script, the load can be adjusted during a test execution by changing the number of pods executing the test.

Figure 5:
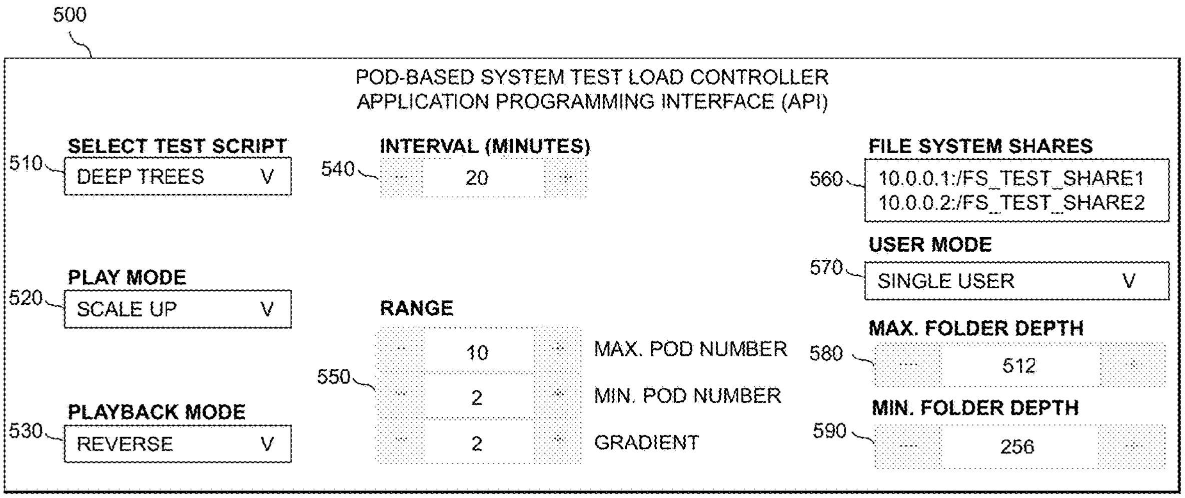
FIG. 5 illustrates an application programming interface provided by the pod-based system test load controller of FIG. 1 in an illustrative embodiment.

FIG. 5 illustrates an API 500 provided by the pod-based system test load controller of FIG. 1 and/or FIG. 4 in an illustrative embodiment. The API 500 may be implemented as a web-based interface that allows a user to customize a desired test load of a given test script by specifying a number of parameters associated with the given test script. In the example of FIG. 5, the API 500 comprises a pull-down menu 510 that allows a user to select a desired test script to execute from a list of available test scripts. In the FIG. 5 example, a deep trees test script is selected which is a test that creates a deep level of folder trees having long file names. Other representative available test scripts may include, for example, test scripts directed to creating: a desired number of HTTP client connections (and/or a number of client requests) within a given time interval to a server system, a desired number of transactions for testing a database system and/or a desired number of input/output operations for testing a storage system. The additional representative available test script options may be displayed, for example, by clicking on the down arrow to the right of the "deep trees" label in the pull-down menu 510 of the example of FIG. 5.

In addition, the API 500 comprises a pull-down menu 520 that allows a user to select a desired play mode for executing a given test script from a list of available play modes. In the FIG. 5 example, a scale-up play mode is selected, whereby the load provided by the test script is gradually increased during an execution of the test script by gradually increasing the number of pods during the test script execution. In at least some embodiments, the following additional play modes are defined. A scale-down mode may be selected, whereby the load provided by the test script is gradually decreased during an execution of the test script by gradually decreasing the number of pods during the test script execution. A steady play mode may be selected, whereby the applied load is maintained (e.g., the load does not change) during the test script execution. A scale randomly mode may be selected, whereby the applied load is randomly changed during an execution of the test script by randomly changing the number of pods during the test script execution.

In the example of FIG. 5, the API 500 further comprises a pull-down menu 530 that allows a user to select a desired playback mode for executing a given test script from a list of available playback modes. Generally, the playback controls how a test script behaves when the applied load reaches a designated maximum or minimum level designated by a user, as discussed below. A reverse playback mode is selected in the FIG. 5 example, whereby, when the selected play mode is a scale-up or a scale-down play mode, and when the scaling reaches the user-defined limit, the scaling process is reversed. For example, if a test script is started using a scale-up play mode, then the test script will change to a scale-down play mode once the test reaches the maximum user-defined load.

In at least some embodiments, the following additional playback modes are defined. A "once" playback mode may be selected, whereby, when the selected play mode is a scale-up or a scale-down play mode, and when the scaling reaches the user-defined limit, the test is stopped. A "keep" playback mode may be selected, whereby, when the selected play mode is a scale-up or a scale-down play mode, and when the scaling reaches the user-defined limit, the test will continue to execute and will maintain the load for the remainder of the test. A "repeat" playback mode may be selected, whereby, when the selected play mode is a scale-up or a scale-down play mode, and when the scaling reaches the user-defined limit, the test will continue to execute with the load changed back to the original level when the test initially started, and then the scaling process repeats.

In addition, the API 500 comprises a value adjustment button 540 that allows a user to specify a test interval (e.g., in minutes) for executing a given test script. The test interval specifies a periodic time (for example) to adjust the load for the selected test script. For example, if the selected play mode is the scale-up play mode and the specified interval is 30 minutes, then the load is scaled up to a new level every 30 minutes.

A user may also specify a maximum number of pods, a minimum number of pods, and a gradient range for a selected test script using a set of value adjustment buttons 550. Generally, the load applied by a selected test script may be changed during the execution of the selected test script within a range designated by a user (e.g., between the specified minimum and maximum number of pods). The applied load is based on the number of pods executing the selected test script. The minimum load may be one selected pod, and the maximum load may be set according to the cluster capability.

The gradient controls how the applied load changes during the execution of a test (e.g., by specifying how many pods change for each specified interval (e.g., two pods are the amount selected in FIG. 5 for each adjustment). For example, if the selected play mode is a scale-up play mode, and the selected load range is 2 to 10, and the gradient is 2, then the load is increased by two pods in each interval, until reaching the maximum limit of 10 pods. By combining the gradient and interval test parameters in this manner, the disclosed techniques for pod-based control of system testing load can provide rich scenarios to enable the execution of test script in accordance with the user-specified parameters.

In some embodiments, one or more of the fields in the API 500 may be tailored to the test script selected using the pull-down menu 510. For the deep trees test script selected in the example of FIG. 5 using pull-down menu 510, the exemplary API 500 further comprises fields 560 through 590 that are specific to the deep trees test script. Field 560 allows a user to specify a set of file system shares to be used during the execution of the deep trees test script. A pull-down menu 570 allows a user to select a desired user mode for executing a given test script from a list of user playback modes. In the example of FIG. 5, the selected user mode is a single user mode, while a multiple user mode may also be available. The selected single user mode simulates a single user accessing the file system shares selected using field 560, while a multiple user mode allows a simulation of multiple users accessing the selected file system shares. A value adjustment button 580 allows a user to specify a maximum folder depth for the selected test script. A value adjustment button 590 allows a user to specify a minimum folder depth for the selected test script.

FIG. 6A is a process diagram illustrating an exemplary implementation of a test instance initiation process 600 in an illustrative embodiment. In the example of FIG. 6A, the test instance initiation process 600 initially obtains the user parameters entered into the API 500 of FIG. 5 and then stores the specified user parameters in a persistent storage. The pod-based system test load controller 400 of FIG. 4 then selects an available cluster, for example, using load balancing techniques, as discussed above. The test instance is then launched (e.g., an execution of the test script is initiated) using the specified user parameters and the selected cluster.

If the user selected a steady play mode (where the applied load is maintained and does not change), for example, using the pull-down menu 520, then the execution returns, since there are no more test updates. Thereafter, the test play interval is set to the interval specified by the user using the value adjustment button 540. The gradient for the test instance is set to the gradient specified by the user using the gradient value adjustment button 550. The test playback mode for the test instance is set to the test playback mode specified by the user using the pull-down menu 530. The maximum number of pods for the test instance is set to the maximum pod number specified by the user using the maximum pod number value adjustment button 550. The minimum number of pods for the test instance is set to the minimum pod number specified by the user using the minimum pod number value adjustment button 550. Finally, the test instance initiation process 600 initiates the test load adjustment process 650 of FIG. 6B.

FIG. 6B is a process diagram illustrating an exemplary implementation of the test load adjustment process 650 in an illustrative embodiment. In the example of FIG. 6B, the test load adjustment process 650 initially obtains the current pod number of the launched test instance. The test load adjustment process 650 enters a loop while the test instance is running. If the user-specified time interval has expired, then the test load adjustment process 650 performs a scale up, a scale down or a random load change based on the selected play mode using the pull-down menu 520, and the number of pods executing the test instance is updated using the user-specified gradient and the current pod number.

In the example of FIG. 6B, if the current pod number has reached the user-specified maximum or minimum number of pods, then the test load adjustment process 650 checks the selected playback settings. For a keep playback mode, the test instance continues to execute without a pod number change (e.g., when the scaling reaches the user-defined limit, the test instance will continue to execute and will maintain the load for the remainder of the test). Likewise, for a repeat playback mode, the test instance will reset to the original pod number, and for a reverse playback mode, a scale-down mode will change to scale-up mode (or vice versa). The while loop then terminates.

Figure 7:
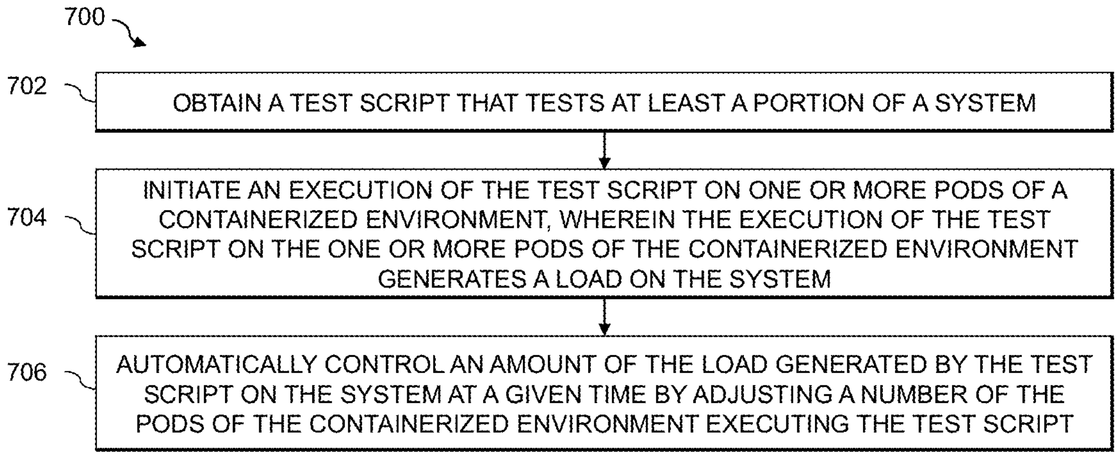
FIG. 7 is a flow diagram illustrating an exemplary implementation of a process for pod-based control of a system testing load in an illustrative embodiment.

FIG. 7 is a flow diagram illustrating an exemplary implementation of a process 700 for pod-based control of a system testing load in an illustrative embodiment. In the example of FIG. 7, the process 700 includes steps 702 through 706. These steps are assumed to be performed, for example, by the pod-based system test load controller 400 of FIG. 4. The process begins at step 702, where a test script is obtained that tests at least a portion of a system. In step 704, an execution of the test script is initiated on one or more pods of a containerized environment, wherein the execution of the test script on the one or more pods of the containerized environment generates a load on the system. An amount of the load generated by the test script on the system at a given time is automatically controlled in step 706 by adjusting a number of the pods of the containerized environment executing the test script.

In some embodiments, the system comprises a server system, a storage system and/or a database system. The automatically controlling the amount of the load generated by the test script on the system at the given time may comprise maintaining a constant number of the pods of the containerized environment executing the test script (e.g., in a steady play mode). The automatically controlling the amount of the load generated by the test script on the system at the given time may comprise randomly adjusting the number of the pods of the containerized environment executing the test script over time (e.g., in a scale randomly play mode).

In one or more embodiments, the automatically controlling the amount of the load generated by the test script on the system at the given time comprises one or more of increasing and decreasing the number of the pods of the containerized environment executing the test script over time (e.g., in a scale-up or scale-down play mode, respectively). The execution of the test script may be stopped when a user-specified load limit is reached (e.g., in a playback once mode). The execution of the test script may be maintained at the user-specified load limit in response to the user-specified load limit being reached (e.g., in a playback keep mode). The execution of the test script may be restored to a load level associated with the given time in response to the user-specified load limit being reached and repeating the one or more of the increasing and the decreasing the number of the pods of the containerized environment executing the test script over time (e.g., in a playback repeat mode). The automatically controlling the amount of the load generated by the test script may comprise a different one of the increasing and the decreasing the number of the pods of the containerized environment executing the test script over time in response to the user-specified load limit being reached (e.g., in a playback reverse mode).

In at least one embodiment, the automatically controlling the amount of the load generated by the test script on the system at the given time is performed using one or more of a user-specified time interval and a user-specified gradient indicating how much the load changes in each time interval (e.g., using the value adjustment button 540 and the gradient value adjustment button 550, respectively, of the API 500 of FIG. 5). The automatically controlling the amount of the load generated by the test script on the system at the given time may be performed according to one or more user parameters entered using an application programming interface (e.g., using the API 500 of FIG. 5). A given cluster of a plurality of clusters may be selected to execute the test script based at least in part on a resource availability of one or more of the clusters of the plurality of clusters (for example, using the resource information collected by the resource collectors 230 in each cluster 215 of worker nodes 222)

The particular processing operations and other system functionality described in conjunction with the process diagrams of FIGS. 6A, 6B, and 7 are presented by way of illustrative example only, and should not be construed as limiting the scope of the disclosure in any way. Alternative embodiments can use other types of processing operations for pod-based control of a system testing load. For example, as indicated above, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Advantageously, the techniques for controlling a system testing load described herein improve the testing of various systems by allowing a user to specify parameters for each test script to control the load applied by each test script. In at least some embodiments, an amount of the load provided by a given test script on a system at a given time is automatically controlled by adjusting a number of the pods of the containerized environment executing the test script.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for controlling a system testing load using an adjustable number of pods will now be described in greater detail with reference to FIGS. 8 and 9. Although described in the context of system 100, these platforms may also be used to implement at least portions of other information processing systems in other embodiments.

Figure 8:
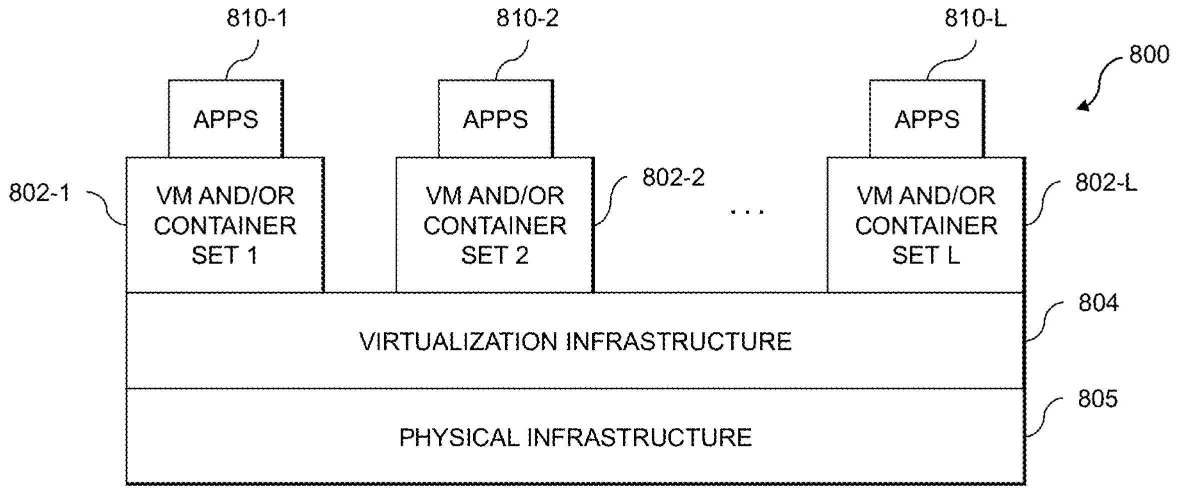
FIGS. 8 and 9 show examples of processing platforms that may be utilized to implement at least a portion of an information processing system in illustrative embodiments.
Figure 9:
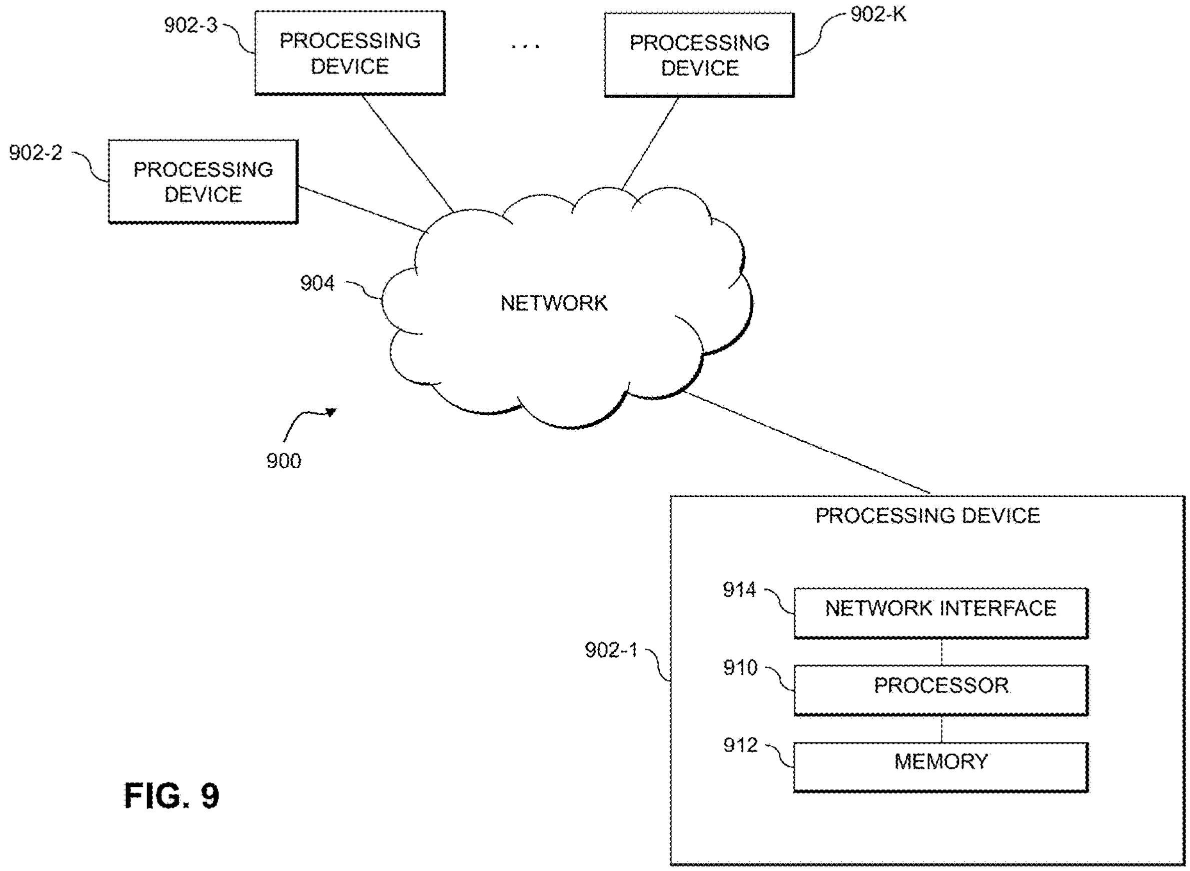

FIG. 8 shows an example processing platform comprising cloud infrastructure 800. The cloud infrastructure 800 comprises a combination of physical and virtual processing resources that may be utilized to implement at least a portion of the information processing system 100 in FIG. 1. The cloud infrastructure 800 comprises multiple VMs and/or container sets 802-1, 802-2, . . . 802-L implemented using virtualization infrastructure 804. The virtualization infrastructure 804 runs on physical infrastructure 805, and illustratively comprises one or more hypervisors and/or operating system level virtualization infrastructure. The operating system level virtualization infrastructure illustratively comprises kernel control groups of a Linux operating system or other type of operating system.

The cloud infrastructure 800 further comprises sets of applications 810-1, 810-2, . . . 810-L running on respective ones of the VMs/container sets 802-1, 802-2, . . . 802-L under the control of the virtualization infrastructure 804. The VMs/container sets 802 may comprise respective VMs, respective sets of one or more containers, or respective sets of one or more containers running in VMs.

In some implementations of the FIG. 8 embodiment, the VMs/container sets 802 comprise respective VMs implemented using virtualization infrastructure 804 that comprises at least one hypervisor. A hypervisor platform may be used to implement a hypervisor within the virtualization infrastructure 804, where the hypervisor platform has an associated virtual infrastructure management system. The underlying physical machines may comprise one or more distributed processing platforms that include one or more storage systems.

In other implementations of the FIG. 8 embodiment, the VMs/container sets 802 comprise respective containers implemented using virtualization infrastructure 804 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 800 shown in FIG. 8 may represent at least a portion of one processing platform. Another example of such a processing platform is processing platform 900 shown in FIG. 9.

The processing platform 900 in this embodiment comprises a portion of system 100 and includes a plurality of processing devices, denoted 902-1, 902-2, 902-3, . . . 902-K, which communicate with one another over a network 904.

The network 904 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 902-1 in the processing platform 900 comprises a processor 910 coupled to a memory 912.

The processor 910 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 912 may comprise random access memory (RAM), read-only memory (ROM), flash memory or other types of memory, in any combination. The memory 912 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 902-1 is network interface circuitry 914, which is used to interface the processing device with the network 904 and other system components, and may comprise conventional transceivers.

The other processing devices 902 of the processing platform 900 are assumed to be configured in a manner similar to that shown for processing device 902-1 in the figure.

Again, the particular processing platform 900 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for pod-based control of a system testing load as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, container environments, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:

obtaining a test script that tests at least a portion of a system;

initiating an execution of the test script on one or more pods of a containerized environment, wherein the execution of the test script on the one or more pods of the containerized environment generates a load on the system; and automatically controlling an amount of the load generated by the test script on the system at a given time by adjusting a number of the pods of the containerized environment executing the test script to provide a corresponding adjustment to the load generated by the test script on the system, wherein the automatically controlling the amount of the load generated by the test script at the given time comprises one or more of increasing and decreasing the number of the pods of the containerized environment executing the test script over time to one or more of increase and decrease, respectively, the amount of the load generated by the test script;

wherein the method is performed by at least one processing device comprising a processor coupled to a memory.

2. The method of claim 1, wherein the system comprises one or more of a server system, a storage system and a database system.

3. The method of claim 1, wherein the automatically controlling the amount of the load generated by the test script at the given time comprises maintaining a constant number of the pods of the containerized environment executing the test script.

4. The method of claim 1, wherein the automatically controlling the amount of the load generated by the test script at the given time comprises randomly adjusting the number of the pods of the containerized environment executing the test script over time.

5. The method of claim 1, wherein the execution of the test script is stopped when a user-specified load limit is reached.

6. The method of claim 1, wherein the execution of the test script is maintained at a user-specified load limit in response to the user-specified load limit being reached.

7. The method of claim 1, wherein the execution of the test script is restored to a load level associated with the given time in response to a user-specified load limit being reached and repeating the one or more of the increasing and the decreasing the number of the pods of the containerized environment executing the test script over time.

8. The method of claim 1, wherein the automatically controlling the amount of the load generated by the test script at the given time comprises a different one of the increasing and the decreasing the number of the pods of the containerized environment executing the test script over time in response to a user-specified load limit being reached.

9. The method of claim 1, wherein the automatically controlling the amount of the load generated by the test script at the given time is performed using one or more of a user-specified time interval and a user-specified gradient indicating how much the load changes in each user-specified time interval.

10. The method of claim 1, wherein the automatically controlling the amount of the load generated by the test script at the given time is performed according to one or more user parameters entered using an application programming interface.

11. The method of claim 1, comprising selecting a given cluster of a plurality of clusters to execute the test script based at least in part on a resource availability of one or more of the clusters of the plurality of clusters.

12. An apparatus comprising:

at least one processing device comprising a processor coupled to a memory;

the at least one processing device being configured to implement the following steps:

obtaining a test script that tests at least a portion of a system;

initiating an execution of the test script on one or more pods of a containerized environment, wherein the execution of the test script on the one or more pods of the containerized environment generates a load on the system; and automatically controlling an amount of the load generated by the test script on the system at a given time by adjusting a number of the pods of the containerized environment executing the test script to provide a corresponding adjustment to the load generated by the test script on the system, wherein the automatically controlling the amount of the load generated by the test script at the given time comprises one or more of increasing and decreasing the number of the pods of the containerized environment executing the test script over time to one or more of increase and decrease, respectively, the amount of the load generated by the test script.

13. The apparatus of claim 12, wherein the automatically controlling the amount of the load generated by the test script at the given time comprises randomly adjusting the number of the pods of the containerized environment executing the test script over time.

14. The apparatus of claim 12, wherein the execution of the test script is one or more of (a) stopped when a user-specified load limit is reached, (b) maintained at the user-specified load limit in response to the user-specified load limit being reached and (c) restored to a load level associated with the given time in response to the user-specified load limit being reached and repeating the one or more of the increasing and the decreasing the number of the pods of the containerized environment executing the test script over time.

15. The apparatus of claim 14, wherein the automatically controlling the amount of the load generated by the test script at the given time comprises a different one of the increasing and the decreasing the number of the pods of the containerized environment executing the test script over time in response to the user-specified load limit being reached.

16. The apparatus of claim 12, comprising selecting a given cluster of a plurality of clusters to execute the test script based at least in part on a resource availability of one or more of the clusters of the plurality of clusters.

17. A non-transitory processor-readable storage medium having stored program code of one or more software programs, wherein the program code when executed by at least one processing device causes the at least one processing device to perform the following steps:

obtaining a test script that tests at least a portion of a system;

initiating an execution of the test script on one or more pods of a containerized environment, wherein the execution of the test script on the one or more pods of the containerized environment generates a load on the system; and automatically controlling an amount of the load generated by the test script on the system at a given time by adjusting a number of the pods of the containerized environment executing the test script to provide a corresponding adjustment to the load generated by the test script on the system, wherein the automatically controlling the amount of the load generated by the test script at the given time comprises one or more of increasing and decreasing the number of the pods of the containerized environment executing the test script over time to one or more of increase and decrease, respectively, the amount of the load generated by the test script.

18. The non-transitory processor-readable storage medium of claim 17, wherein the execution of the test script is one or more of (a) stopped when a user-specified load limit is reached, (b) maintained at the user-specified load limit in response to the user-specified load limit being reached and (c) restored to a load level associated with the given time in response to the user-specified load limit being reached and repeating the one or more of the increasing and the decreasing the number of the pods of the containerized environment executing the test script over time.

19. The non-transitory processor-readable storage medium of claim 17, comprising selecting a given cluster of a plurality of clusters to execute the test script based at least in part on a resource availability of one or more of the clusters of the plurality of clusters.

20. The non-transitory processor-readable storage medium of claim 17, wherein the automatically controlling the amount of the load generated by the test script at the given time is performed using one or more of a user-specified time interval and a user-specified gradient indicating how much the load changes in each user-specified time interval.

* * * * *